3,134,714
IMMUNIZATION OF FABRICS AGAINST INSECT ATTACKS

Roy James Pence, Los Angeles, Calif., assignor to The Regents of the University of California, Berkeley, Calif.
No Drawing. Filed Aug. 31, 1959, Ser. No. 836,907
19 Claims. (Cl. 167—37)

This invention pertains to means and methods directed to the immunization of textiles, fabrics, yarns, carpets, upholstery and other articles made from or containing animal fibers against attack and destruction by insect pests.

The protection of fibers and articles made therefrom from attack and destruction by insect pests has presented a problem for a great many years. With limited exception the use of insecticides and various moth-proofing agents has many disadvantages in that the prior methods and materials were not effective over protracted periods of time, often caused staining or damage to the articles being proofed and included toxic components. The application of a toxic compound to a carpet, for example, subjects children to danger since many children apply their mouths to carpets. Prior methods of approach often employed stomach poisons and attempted to kill the insects by poisoning them or by asphyxiating them. The present invention uses non-toxic ingredients which employ a totally different mode of operation.

Insect pests which cause the greatest amount of damage to animal fibers, bristles and hair comprise the dermestids (such as black carpet beetle, furniture carpet beetle, varied carpet beetle and common carpet beetle) and the clothes moths, such as the tapestry moth, webbing clothes moth and case-making moth.

Although insect pests prefer animal fibers as a food source, almost any fiber (except mineral fiber) will be devoured if the fiber is contaminated or enriched with nutrients. Even synthetic fibers made from polyamids, polyesteramids, regenerated cellulose, vinyl esters, etc. in the form of polymers, copolymers and condensation products will be attacked by the pests if nutrients are carried by the fibers. Mixtures of natural fibers such as wool, cotton, silk, flax, etc., with synthetic fibers are subject to attack.

It appears that the proteins and globulins which are found in animal fibers (such as keratin in wool) constitute the nutrients which cause such fibers and fibers of keratin-myosin and collagen groups to be attacked by the insect pests. Moreover, it has been discovered that components of the vitamin B complex are the most important nutrients of fabric pests, and in their absence growth is retarded, metamorphosis of the insect pests is not completed, and death occurs. Upon encountering fibers which do not contain keratin or which do not contain the vitamin B factors, the insects find the fibers unpalatable and search for other food.

The present invention is based upon the concept of treating fibers (and objects made therefrom) in such manner as to present antimetabolites and/or amino-acid analogs to the insect pests and thereby render the fibers unpalatable; when ingested by the insect pests the antimetabolites and/or protein intake inhibitors prevent normal growth and metamorphosis and cause death by starvation. The methods embraced by this invention are applicable to fibers, yarn and new and old articles (such as fabrics, felts, carpets, etc.) made from natural or synthetic fibers, hair, or mixtures thereof. The compositions and ingredients employed are non-toxic to humans and readily and inexpensively applied.

The terms "antimetabolites" and "analogs" as used herein refer to compounds which bear a chemical similarity to vitamins or other metabolites, but function as biological antagonists to the chemical which they structurally resemble. These analogs inhibit the metabolic process of the insect and/or the development of microorganisms and/or inhibit the breakdown of protein. The preferred analogs and antimetabolites are non-toxic to humans and animals and are readily distinguishable from insecticides and fungicides by reason of their different mode of operation.

The principal object of this invention is to provide methods and means for eliminating and destroying insect pests (which normally infest, attack and devour animal and other fibers or hair and articles made therefrom or containing the same) by retarding or inhibiting their metabolic processes, thereby preventing the normal growth and metamorphosis of the insects.

The object is also atained by rendering unpalatable and ineffective the normal food of such insects and in restraining or inhibiting the synthesis of nutrient factors on the fibers or articles, whereby the insects cannot continue to live on the usual spillage and contaminations absorbed by fabrics, carpets, etc.

Another object is to disclose and provide methods and means for effectively protecting or immunizing fibers and articles made thereby from attack and destruction by insect pests. The invention is also directed to methods whereby such protection may be imparted to individual fibers, thread or yarn, and/or to fabrics, felts, carpets and woven or knitted goods and other articles made from fibers.

A still further object is to disclose compounds and materials having characteristics which are particularly well adapted to the attainment of the desired immunization of fibers, textiles and carpets as above noted.

The aforesaid objects of this invention are attained by depositing or applying upon the fibers to be protected analogs of factors of the vitamin B complex either alone or in combination with analogs of keratin, fibroin, or other proteinaceous materials which normally constitute nutrients for the insect pests. These analogs or antimetabolites inhibit the metabolic processes of the insect, as previously stated, render the fibers unpalatable to the insect, and in effect, cause the insect to die of starvation, very few being able to complete their normal metamorphosis. The analogs and antimetabolites thus applied to the fibers of a carpet, for example, also render unpalatable particles of food or normally edible contaminants which may have been dropped upon the carpet. They also inhibit the growth and propagation of molds, spores and fungi which synthesize pantothenic acid, a factor seemingly essential to the normal growth and metamorphosis of these insect pests. The antimetabolites and analogs may be applied in the form of aqueous solutions to the articles to be protected, as by sponging, dipping or spraying and they can also be applied and made a tenaciously adhering portion of freshly made thread, yarn, woven and knitted fabrics, textiles, tapestries, curtains, etc.

Although animal fibres such as wool, cashmere, vicuna, Angora, bristles, hair and fur per se constitute nutrients for insect pests, various other nutritious materials are normally available to the insects and permit their growth, propagation and attack. For example, spilled food, drinks and urine on carpet provide abundant food and render such carpet vulnerable to attack even when the carpet fibers are synthetic and not a normal source of food. Perspiration and sebaceous secretions (body oils) constitute another source of nutrients for such insects; the common bacterium *Escherichia coli* is associated with body oils and is known to synthesize pantothenic acid in common with many ubiquitous species of micro-organisms.

Body oils and perspiration also act as "attaching agents" for many common fungi and mildews such as *Aspergillus niger*, *Neurospora crassa* and Penicillium species, which are both air-borne and are found in vast quantities in soil. Many of these species of fungi and mildews are capable of synthesizing pantothenic and nicotinic acid; these substances are important factors of the vitamin B complex and stimulate the growth and metabolism of the insect pests. As a result, soiled fabrics, vacuum cleaning brushes, carpets, etc., become subject to attack and destruction by the insect pests, even though the fabrics were initially "clean" and not a source of nutrients. Even the insect itself may be responsible for indirect contamination; fecal matter from insects placed upon "sterile" fibers permits the growth of fungi which synthesize nutrients.

Numerous antimetabolites may be used in accordance with the process of this invention. In order to counteract pantothenic acid one may use pantoyltaurine, cysteic acid, w-methylpantothenic or acid sulfanilamide as antimetabolites. Another important vitamin B complex factor whose effect should be inhibited is niacin (nicotinic acid); effective antimetabolites known to inhibit niacin are picolinic acid, sulfanilamide, 3-acetylpyridine, pyridine-3-sulfonic acid, etc. It is to be noted that sulfanilamide acts as a direct inhibitor of niacin and a secondary inhibitor of pantothenic acid and is therefore one of the preferred analogs or antimetabolites. It is also desirable to employ analogs of other factors of the vitamin B complex, such as analogs of riboflavin, choline chloride, pyrodoxin or thiamin, etc., but these latter factors do not appear to be as essential to the growth and metamorphosis of the dermestids and clothes moths which cause greatest damage to fibers and articles made therefrom.

Reference has been made to the fact that keratin and similar proteinaceous materials are effective nutrients for dermestids and moths which attack animal fibers. In accordance with one aspect of this invention, the fibers (or fibrous articles) are treated with amino acid growth factor analogs which inhibit protein breakdown and, in accordance with the present invention, inhibit normal metamorphosis and cause death of the insects by malnutrition and starvation. Such amino acid inhibitors or analogs may include one or more substances such as canavanine sulfate; aminoacetic acid; allyl glycine; DL-beta-phenyllactic acid; L-arginine monohydrochloride; DL-leucine; D-leucine; indole; L-asparagine; 3-amino tyrosine; DL-methyl glutamic acid; DL-methionine sulfoxide; B-2-thienylalanine; B-2-thienyl serine; DL-para-fluorphenylalanine, etc.

An aqueous solution for immunizing fabrics, textiles, fibers and articles made therefrom may contain from about 0.5% to 20% of one or more of the antimetabolites or analogs. The concentration may vary greatly since a 20% solution can be sprayed as an aerosol and deposit an amount of antimetabolite equal to that deposited by sponging a fabric with a 1% solution. Methods of application, economic considerations and inherent effectiveness of the analogs in rendering the nutrients unpalatable, counteracting the growth factors and impairing normal metabolic processes of the insect pests should be considered. For example, 3-acetylpyridine in a 3% solution is as effeive as a 2% solution of picolinic acid and economic aspects favor the use of the latter.

It may be noted that the deposition of antimetabolites upon fibers and their adherence thereto appears to be facilitated by the use of small amounts of surfactants or wetting agents in the aqueous solutions. No significant differences have been observed between the effectiveness of cationic, anionic and non-ionic surfactants, but cationic-type activators contribute somewhat to the lasting qualities of the treatment. Salts of primary, secondary and terttiary amines and long chain fatty amines are suitable, as well as quatenary ammonium compounds, alkyl aromatic sulfonic acid salts, sulfuric esters and sulfates, fatty acid soaps, sulfonamids and various other available surfactants. Some surface-active agents containing the stearyl group are particularly effective in that they are firmly and rapidly absorbed by the fibers, impart a soft, rich hand to the fibers even at very low concentrations and resist washing off to a significant extent. The use of surfactants to facilitate coating is to be preferred to the use of casein, gums or other adhesives.

If it is desired to use a detergent or surfactant in a treating solution of this invention, it may be present in concentrations of from 0.01% to 2% by weight. Other materials and components may be present and the invention is not to be limited to the exemplary proportions or ranges here given. Moreover, although specific reference has been made to the application of the analogs and antimetabolites to fibers and fibrous articles in the form of an aqueous solution (most of the analogs are water-soluble or water-dispersible) it is to be understood that they may be applied in the form of emulsions, pastes or creams; concentrated base mixtures of antimetabolites and detergents or surfactants may be made, shipped and sold, the ultimate user then suitably diluting the base for application.

When original fibers, thread, yarn or fabrics are to be immunized by the process of this invention, the immunization may become a part of the coloring, dyeing, mordanting or dye-vat process, during which the antimetabolite or analog is impregnated into and firmly attached to the fiber. The use of cationic surface-active agents of the type last above referred to is advantageous in such original treatment. The immunizing process thus applied remains effective after repeated dry cleaning with organic or petroleum solvents. It is to be understood that the analogs may be combined with other substances (or their structural formulas may be slightly modified by the inclusion of sulfonic acid groups and the like) to facilitate the application of the analogs to fibers (particularly wool) during dyeing, during the last stages of wool scouring, in back washers, etc.

The immunizing process is also applicable to fabrics and clothing which may be sponged, sprayed with or dipped in the aqueous treating solutions containing the antimetabolites. Flannels and other open-width woolen fabrics may be continuously treated by being subjected to a spray of antimetabolite solution, and then passed through squeeze rolls and over drying rolls. Fabrics can be simultaneously immunized and rendered water-repellent by conjoint use of an antimetabolite and a cationic type of surfactant (such as a long chain compound in which a quaternary nitrogen is linked through a methylene group to an amide or ester group which, in turn, is linked to a long straight chain aliphatic radical); after such solution is applied to the fabric, it is dried by the application of heat which causes the surfactant to break down and leave a water-repellent coating on the fibers.

The following test results illustrate and exemplify the effects obtained by this invention.

A water solution of equal parts of picolinic acid and sulfanilamide (total concentration 2.25%) was sprayed upon swatches of wool blanket. One sprayed test swatch was inoculated with first-instar larvae (newly hatched) of clothes moths and the test swatch confined in a vented container. Examination conducted 192 hours later showed a complete kill. Another sprayed test swatch was inoculated with first-instar carpet beetles, placed in a similar container. Examination conducted 200 hours later showed about 50% kill, with survivors feeding on the dead larvae in order to supplement their niacin intake. Subsequent examination showed progressively increasing mortality of stunted insects. A third sprayed swatch, similarly inoculated with first-instar carpet beetles was placed in one side of a large container containing an unsprayed swatch at some distance therefrom on the other side of the container. Within 24 hours all beetles had left the sprayed swatch and migrated to the unsprayed swatch. It must be noted that in all the above tests, insects were confined to close quarters when feeding became forced with no opportunity for the test specimens to migrate to accepted diets.

Tests with first-instar webbing clothes moth larvae conducted upon strips of flannel soaked with a 2% solution of sulfanilamide alone in water and other tests with a 2% solution of picolinic acid alone in water (the strips being wrung dry and dried) showed results similar to those obtained in the above described tests. Other tests indicated that at concentrations of 1% and lower the effect of these antimetabolites was delayed and the second-instar was reached, but growth and metabolic processes were greatly slowed down. Some damage to the test swatches was observable, but it was evident that the treated swatches were distasteful to the insects and given an opportunity to migrate, the insects would leave the treated areas.

Tests were conducted with swatches of wool carpeting purposely soiled with beer and urine. One half of each swatch was then cleaned with a sponge carrying an aqueous solution containing about 1% by weight of a detergent (soap and commercially available household surfactants were employed) and 1.7% of the antimetabolite. These tests simulated the usual steps used to remove food stains, etc., from carpeting in household cleaning. In all cases clothes moth larvae were quick to devour the carpeting which was not treated with the antimetabolite-containing cleaning solution; they subsequently migrated to the treated sections and mortality ensued.

Similar tests with demestids resulted in 50% mortality within 5-6 days. It may be noted that in the above tests all of the beer and urine was not removed by the sponging with the treating solution; the effectiveness of the antimetabolites in protecting soiled carpeting was emphasized by still further tests wherein purposely soiled carpeting (containing added nutrients such as brewers' yeast) was lightly sprayed with a 10% aqueous solution of antimetabolite containing less than 0.02% of a surfactant; no evidence of damage by carpet beetles was observed after 200 hours.

The total quantity of analog deposited upon or attached to the fibers to be immunized will vary with the type and condition of the fibers and the article being treated. A very small amount will protect coarse bristles such as are used in vacuum cleaning brushes; larger amounts may be required for a deep pile carpet. Carpeting and flannels may be caused to absorb and carry as much as 50 gr. of antimetabolite per square meter (deep pile carpet), 25 gr. per square meter (short, loop type carpet) and 7 gr. per square meter of all wool 14-15 oz. flannel. Normal, effective treatments can be obtained by the use of one-quarter of these exemplary maximums. Application of treating solutions in the form of a spray at the rate of 50-75 cc. per square meter of fabric being treated (equivalent to between about 1.0 and 2.0 gr. per square meter) produces immunization.

Prior proofing compounds such as chlorinated hydrocarbons, chlorophenyl-urea compounds and compounds such as salts of N-(3,4-dichlorophenyl)N¹-2 (2-sulfo-4-chlorophenoxy)-5-chlorophenyl-urea are stomach poisons and it is probable that insects develop a tolerance for many such compounds. The antimetabolites, on the other hand, are not stomach poisons, are non-toxic and there is no evidence of biological factors which tend to suppress their effectiveness with passing generations of pests.

It may be noted that the aqueous cleaning and immunizing solutions are colorless, odorless and tasteless, and do not produce buckling, warping, softening or other deleterious effects on rubberized or synthetic carpet backing, which often results when cleaning or mothproofing solutions containing petroleum, organic or chlorinated solvents are employed. Discoloration or staining of carpeting of undesirable nature is not produced by my solutions.

Tests conducted with carpeting made of synthetic fibers (each swatch including an untreated original section, a section soiled with beer and a section treated with an antimetabolite) clearly demonstrated the effectiveness of the process and the selective feeding habits of the pest insects. The soiled synthetic fiber sections were attacked and destroyed; thereafter the pest insects attacked the untreated original section and caused some damage, but the treated section was completely avoided.

I claim:

1. An effective immunizing agent for application to fibers and articles made therefrom to protect the same from attack by fiber-eating insects, comprising a solution consisting essentially of a surfactant and about 0.5% to 20% by weight of a member of the group consisting of DL-para-fluorphenylalanine, 3-amino tyrosine and antimetabolic analogs of niacin and pantothenic acid.

2. An effective immunizing agent for application to fibers and articles made therefrom to protect the same from attack by fiber-eating insects, comprising a solution consisting essentially of a surfactant and about 0.5% to 20% by weight of DL-para-fluorphenylalanine.

3. An effective immunizing agent for application to fibers and articles made therefrom to protect the same from attack by fiber-eating insects, comprising a solution consisting essentially of a surfactant and about 0.5% to 20% by weight of 3-amino tyrosine.

4. Fibers and articles made therefrom having uniformly applied thereto a tenacious, long-lasting deposit of a member of the group consisting of DL-para-fluorphenylalanine, 3-amino tyrosine and antimetabolic analogs of niacin and pantothenic acid whereby such fibers and articles are protected from attack by fiber-eating insects.

5. A method of killing fiber-eating insect pests by ingestion of an antimetabolic analog of an essential nutrient which comprises depositing substances from the group consisting of antimetabolic analogs of proteinaceous materials and factors of the vitamin B complex upon the nutrient fibers of such pests.

6. A method of killing fiber-eating insect pests by ingestion of an antimetabolic analog of an essential nutrient which comprises depositing a member of the group consisting of DL-para-fluorphenylalanine, 3-amino tyrosine and antimetabolic analogs of niacin and pantothenic acid upon the nutrient fibers of such pests.

7. A method of immunizing fibers and articles made therefrom from destruction by fiber-eating insect pests by depositing on said fibers and articles an antimetabolic analog of an essential nutrient of said fiber-eating insects which comprises depositing a member of the group consisting of DL-para-fluorphenylalanine, 3-amino tyrosine and antimetabolic analogs of niacin and pantothenic acid upon the fibers to be protected.

8. An effective immunizing agent for application to fibers and articles made therefrom to protect the same from attack by larvae of fiber-eating insects, comprising a solution consisting essentially of a surfactant and about 0.5% to 20% by weight of picolinic acid.

9. An effective immunizing agent for application to fibers and articles made therefrom to protect the same from attack by fiber-eating insects, comprising a solution consisting essentially of a surfactant and about 0.5% to 20% by weight of sulfanilamide.

10. Fibers and articles made therefrom having uniformly applied thereto a tenacious, long-lasting deposit of DL-para-fluorphenylalanine whereby such fibers are protected from attack by fiber-eating insects.

11. Fibers and articles made therefrom having uniformly applied thereto a tenacious, long-lasting deposit of 3-amino tyrosine whereby such fibers and articles are protected from attack by fiber-eating insects.

12. Fibers and articles made therefrom having uniformly applied thereto a tenacious, long-lasting deposit of picolinic acid whereby such fibers and articles are protected from attack by fiber-eating insects.

13. Fibers and articles made therefrom having uniformly applied thereto a tenacious, long-lasting deposit of sulfanilamide whereby such fibers and articles are protected from attack by fiber-eating insects.

14. A method of immunizing fibers and articles made therefrom from destruction by fiber-eating insect pests which comprises depositing DL-para-fluorphenylalanine upon fibers to be protected.

15. A method of immunizing fibers and articles made therefrom from destruction by fiber-eating insect pests which comprises depositing 3-amino tyrosine upon fibers to be protected.

16. A method of immunizing fibers and articles made therefrom from destruction by fiber-eating insect pests which comprises depositing picolinic acid upon fibers to be protected.

17. A method of immunizing fibers and articles made therefrom from destruction by fiber-eating insect pests which comprises depositing sulfanilamide upon the fibers to be protected.

18. A method of immunizing articles made of nutrient fibers subject to destruction by fiber-eating insect pests which comprises depositing upon fibrous articles, composed of such fibers, an antimetabolic analog of an essential nutrient of such fiber-eating insects.

19. A method as stated in claim 18 wherein from between about 1.75 grams and 50 grams of such antimetabolic analog is deposited per square meter of such article.

References Cited in the file of this patent
UNITED STATES PATENTS

| | | |
|---|---|---|
| 2,293,034 | Moore | Aug. 18, 1942 |
| 2,938,053 | Blake | May 24, 1960 |
| 2,954,315 | Gordon | Sept. 27, 1960 |

OTHER REFERENCES

Chem. Abs. 36, 3218 (2); 37, 403 (6).
Exptl. Med. and Surg., 8, 5 (1950).
Harrow: Textbook of Biochemistry, fifth edition, pp. 300–309, February 1951.
Wooley: A Study of Antimetabolites, 1952, pp. 42, 146.
King: U.S. Dept. Agr. Handbook No. 69, May 1954 (p. 197).
King: Chemicals Evaluated as Insecticides, U.S. Dept. of Agriculture Handbook, No. 69, pp. 1–18 and 238 to 240, pp. 238 to 240 are particularly relied on, May 1954.